United States Patent
Guillou et al.

(10) Patent No.: US 12,292,537 B2
(45) Date of Patent: May 6, 2025

(54) SEISMIC EQUIPMENT CONNECTING MODULE AND METHOD

(71) Applicant: SERCEL, Carquefou (FR)

(72) Inventors: Louis Guillou, Carquefou (FR); Jean-Jacques Vignaux, Carquefou (FR)

(73) Assignee: SERCEL, Carquefou (FR)

( * ) Notice: Subject to any disclaimer, the term of this patent is extended or adjusted under 35 U.S.C. 154(b) by 492 days.

(21) Appl. No.: 17/861,665

(22) Filed: Jul. 11, 2022

(65) Prior Publication Data

US 2024/0012166 A1 Jan. 11, 2024

(51) Int. Cl.
*G01V 1/20* (2006.01)
*G01V 1/38* (2006.01)
*H01R 13/426* (2006.01)
*H01R 13/66* (2006.01)

(52) U.S. Cl.
CPC ............ *G01V 1/202* (2013.01); *G01V 1/3843* (2013.01); *H01R 13/426* (2013.01); *H01R 13/665* (2013.01)

(58) Field of Classification Search
CPC .... G01V 1/202; G01V 1/3843; H01R 13/426; H01R 13/665
USPC .................................................. 439/620.21
See application file for complete search history.

(56) References Cited

U.S. PATENT DOCUMENTS

| | | | | |
|---|---|---|---|---|
| 4,823,325 A * | 4/1989 | Cole, Jr. | ................ | G01V 1/201 367/19 |
| 6,111,817 A * | 8/2000 | Teeter | ................ | G01V 1/3826 367/13 |
| 7,377,224 B2 * | 5/2008 | Ryan | ................ | G01V 1/3826 114/244 |
| 9,475,553 B2 * | 10/2016 | Roger | ................ | B63B 21/66 |
| 9,599,736 B2 * | 3/2017 | Roger | ................ | G01V 1/3826 |
| 10,168,441 B1 * | 1/2019 | Nicolas | ................ | G01V 1/202 |
| 10,618,606 B2 * | 4/2020 | Nicolas | ................ | B63B 35/04 |
| 2008/0008033 A1 * | 1/2008 | Fossum | ................ | G01V 1/3826 367/16 |
| 2015/0098303 A1 * | 4/2015 | Roger | ................ | G01V 1/3826 367/17 |

FOREIGN PATENT DOCUMENTS

| | | | | |
|---|---|---|---|---|
| EP | 2857869 A1 * | 4/2015 | ........... | G01V 1/3826 |
| GB | 2424949 A * | 10/2006 | ............. | B63B 21/56 |

* cited by examiner

*Primary Examiner* — Peter G Leigh
(74) *Attorney, Agent, or Firm* — PATENT PORTFOLIO BUILDERS PLLC

(57) ABSTRACT

A connecting module for connecting seismic equipment towed in water, includes a housing having first and second ends opposite to each other, a removable connecting part removably attached to the first end of the housing, an integral connecting part integrally made with the housing at the second end, the integral connecting part having a bore, and one or more pins configured to enter from an outside of the integral connecting part into the bore. An end of the one or more pins has a conical surface that is configured to transfer a radial force $F_R$ applied to the one or more pins, as a longitudinal force $F_L$ to an electrical insert to be placed in the bore.

20 Claims, 14 Drawing Sheets

SEISMIC EQUIPMENT CONNECTING MODULE AND METHOD

BACKGROUND

Technical Field

Embodiments of the subject matter disclosed herein generally relate to methods and systems for mechanically connecting seismic equipment to each other in anticipation of acquiring seismic data, and more particularly, to mechanisms and techniques for electrically and/or optically connecting the seismic equipment to each other in addition to a mechanical coupling.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 110 tows plural detectors/sensors 112, (e.g., hydrophones, geophones and/or accelerometers) which are disposed along plural cables 114. A single cable 114 together with its corresponding detectors 112 are sometimes referred to, by those skilled in the art, as a streamer 116. Vessel 110 may tow plural streamers 116 at the same time, as shown in the figure. The streamers may be disposed horizontally, i.e., lie at a constant depth relative to the ocean surface 118. Also, the plural streamers 116 may form a constant angle (i.e., the streamers may be slanted) with respect to the ocean surface or they may have a variable-depth profile (Broadseis, CGG). The totality of streamers and associated equipment (e.g., birds, as disclosed in U.S. Pat. No. 9,475,553, the entire content of which is incorporated herein by reference) form a streamer spread. Still with reference to FIG. 1, vessel 110 may also tow a seismic source array 120 configured to generate an acoustic wave. The acoustic wave propagates downward and penetrates the seafloor, eventually being reflected by a reflecting structure. The reflected acoustic wave propagates upward and is detected by detectors 112.

The streamers are towed by the vessel 110 along a pre-plot path X (inline direction). Each streamer includes plural streamer sections. As an example, FIG. 1 shows a streamer $116_k$, where k can vary between 1 and 30, having many sections $116_i$ connected to each other by a streamer connecting module 117. FIG. 1 labels, for simplicity, only two streamer sections $116_i$ and $116_{i+1}$ connected to each other by the module 117, where "i" can vary between 1 and 100. FIG. 1 also shows a streamer 116 having a head 116A and a tail 116B.

During the seismic acquisition phase, the streamers 116 are maintained with a certain offset from each other along the cross-line direction Y by using a combination of ropes 120 and deflectors 122 located at the head of the streamers, as shown in FIG. 1. Also, for maintaining a certain depth of the streamer heads 116A, one or more head buoys 124 are connected to corresponding streamer heads. Similar buoys (not shown), called tail buoys, are connected to the tail end 116B of the streamers.

During the seismic acquisition process, as the vessel advances along the pre-plot path X, large forces/tensions appear in the streamer sections and the modules connecting them. For these reasons, a strength member (e.g., one or more steel cables) is present inside each streamer section. The same tension is present in each streamer connecting module 117. Thus, the housing of the streamer connecting module 117 and also the connecting parts of the streamer sections need to be made to have a large thickness to withstand the tensions present in these elements while the vessel moves. Complicating this problem, is the fact that the streamer connecting module 117 is made of various separate parts, that need to be attached to each other and to ensure, at the same time, strong electrical connections between the various components. The attachment points constitute weak points as a large force is exerted on them while the streamers are pulled by the vessel. For example, it is customary to have a traction of up to 4 tons exerted by the streamer/vessel on each connecting module 117. For these reasons, the connecting modules are typically made to have a large thickness. This large size of these parts induces various problems, due to their size and weight, e.g., the generation of waves (noise) along the streamer.

Thus, there is a need to streamline the connecting modules along the streamer for having a reduced size and weight to avoid the noise generation. Accordingly, it would be desirable to provide systems and methods with such capabilities.

SUMMARY

According to an embodiment, there is a connecting module for connecting seismic equipment towed in water. The connecting module includes a housing extending along a longitudinal axis X so that first and second ends are opposite to each other, a removable connecting part removably attached to the first end of the housing, an integral connecting part integrally made with the housing at the second end, the integral connecting part having a bore, and one or more pins configured to enter from an outside of the integral connecting part into the bore. An end of the one or more pins has a conical surface that is configured to transfer a radial force $F_R$ applied to the one or more pins, as a longitudinal force $F_L$ to an electrical insert to be placed in the bore. The radial force $F_R$ is applied along a radial axis of the housing and the longitudinal force $F_L$ is applied along the longitudinal axis X.

According to another embodiment, there is a connecting module for connecting seismic equipment towed in water, and the connecting module includes a housing extending along a longitudinal axis X so that first and second ends are opposite to each other, the housing defining a sealed chamber, electronics located within the chamber, an integral connecting part integrally made with the housing at the second end, the integral connecting part having a bore, an electrical insert located within the bore and configured to electrically or optically connect to the electronics, and one or more pins configured to enter from an outside of the integral connecting part into the bore, through a wall of the integral connecting part. An end of the one or more pins has a conical surface that is configured to transfer a radial force $F_R$, applied on the one or more pins, as a longitudinal force $F_L$ to the electrical insert.

According to yet another embodiment, there is a method for connecting a first streamer section to a second streamer section. The method includes providing a connecting module having a housing that extends along a longitudinal axis X so that first and second ends are opposite to each other, the housing defining a sealed chamber wherein an integral connecting part is integrally made with the housing at the second end, the integral connecting part having a bore, electrically or optically connecting electronics with an electrical insert, inserting the electronics and the electrical insert into the connecting module so that the electrical insert sits inside the bore and the electronics sits inside the chamber, inserting one or more pins, from an outside of the integral connecting part, toward the bore, through a wall of the integral connecting part, and tightening the one or more pins so that an end of the one or more pins, which has a conical surface, enters the bore and transfers a radial force $F_R$, applied on the one or more pins, as a longitudinal force $F_L$ to the electrical insert.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a connecting module for connecting to each other two streamer sections. However, the embodiments to be discussed next are not limited to these elements. The connecting module may be used to connect other elements used in a seismic acquisition system, like birds.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
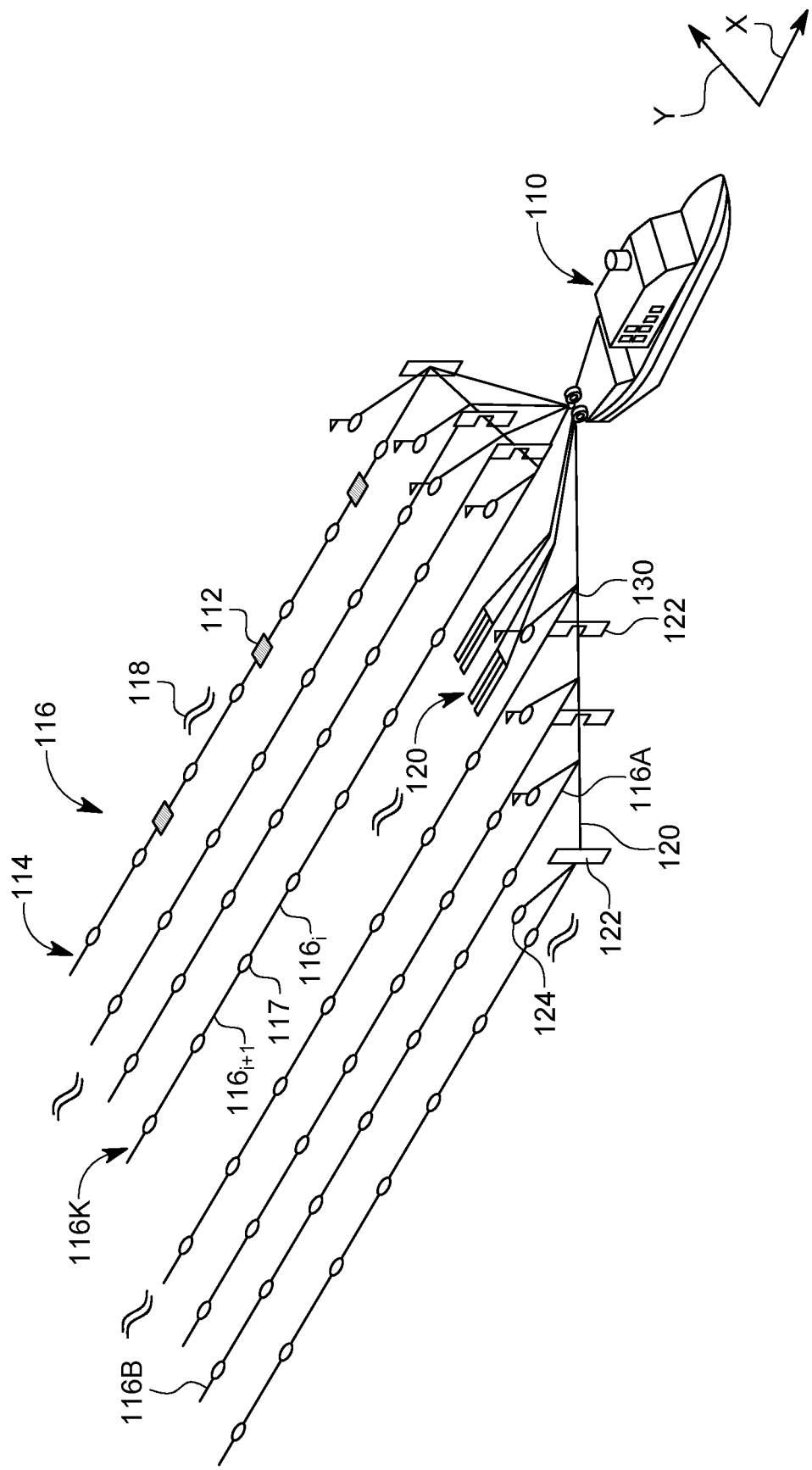
FIG. 1 is a schematic diagram of a conventional seismic data acquisition system having plural horizontal streamers.
Figure 2:
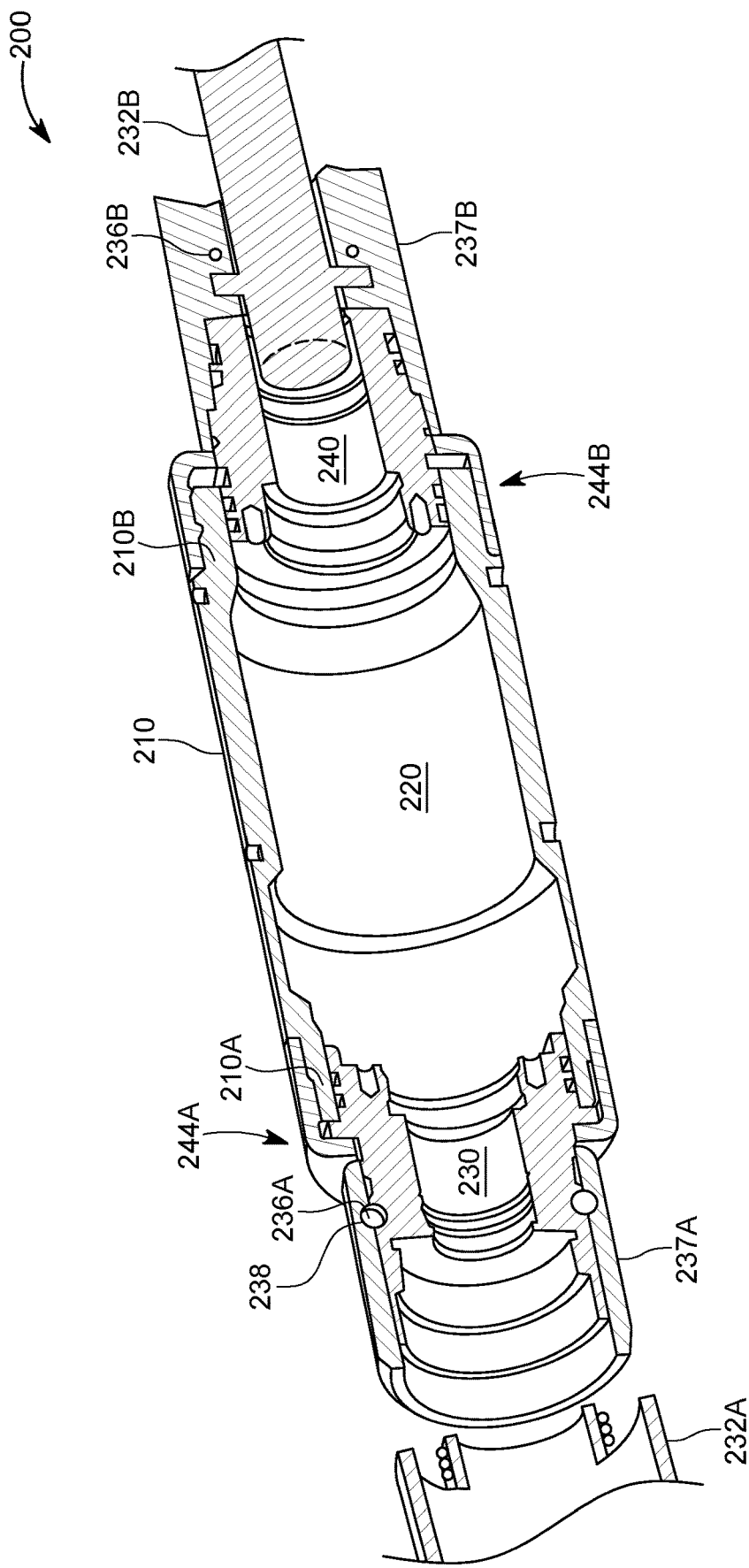
FIG. 2 illustrates a streamer connecting module that connects two streamer sections to each other.

A traditional streamer connecting module 200 is illustrated in FIG. 2. FIG. 2 shows the streamer connecting module 200 having a housing 210 that defines an internal chamber 220. Various elements (e.g., electrical, communication wires) may be located inside internal chamber 220 when the streamer connecting module is connecting the streamer modules 232A and 232B. For simplicity, all the internal elements of this connection are omitted in FIG. 2. FIG. 2 also shows electrical connecting parts 230 and 240 for receiving the first streamer section 232A and the second streamer section 232B, respectively. First streamer section 232A is screwed into coupling nut 237A and this coupling nut is rotatably attached to connecting part 230 through balls 236A. The rotation of the streamer section 232A relative to the streamer connecting part 230 may be achieved, for example, by placing the plural balls 236A in a space 238 defined between the streamer section 232A and the streamer connecting part 230, as illustrated in FIG. 2. The second streamer section 232B has a coupling nut 237B that is screwed into connecting part 240 as also shown in FIG. 2. Second streamer section 232B is rotatably attached to coupling nut 237B through a set of balls 236B. Streamer connecting parts 230 and 240 are part of the streamer connecting module 200, and removably connected to the housing 2220 of the streamer connecting module 200. One of the streamer connecting part is a female connector while the other one is a male connector.

Streamer connecting part 230 has a fastening nut 244A that fastens directly to one end 220A of the housing 220 and streamer connecting part 240 has a fastening nut 244B that fastens directly to an opposite end 220B of the housing 220. Streamer connecting part 230 also has a coupling nut 237A that fastens directly to the streamer section 232A. Note that both connecting parts 230 and 240 are removably attached to the housing 220.

According to a novel embodiment, one of the connecting parts of the connecting module is integrated into the housing so that the connecting module has only one connecting part that needs to be attached to the housing. In other words, instead of having two connecting parts that are removably attached to the housing, one connecting part is manufactured to be an integral part of the housing. This means that this integral connecting part cannot be removed from the housing by unscrewing or removing a fastener, as is the case for the removably connecting part. For this novel configuration, the electrical coupler (or insert) that electrically connects one streamer section to another streamer section includes one or more pins that are shaped to have conical surfaces, which fit conical surfaces of the electrical coupler or an intermediate part to hold the electrical coupler in place. This novel configuration ensures that the connecting module has a better mechanical strength, reduced cost, reduced number of mechanical components, and improves the waterproofing of the chamber defined by the module.

Figure 3A:
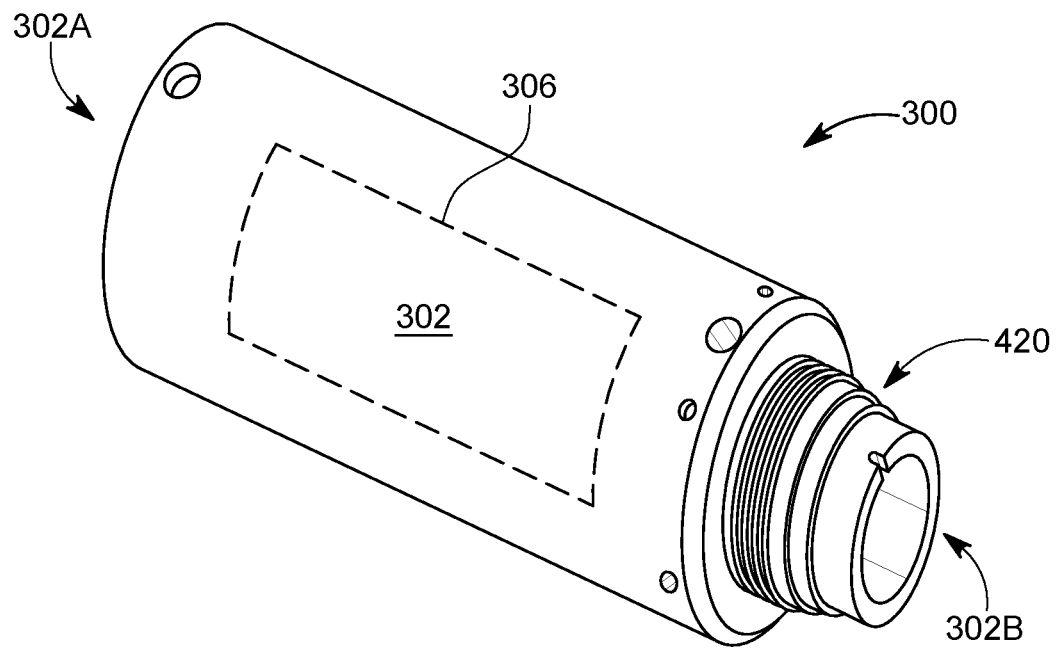
FIGS. 3A and 3B illustrate a connecting module having a removable connecting part and an integral connecting part.
Figure 3B:
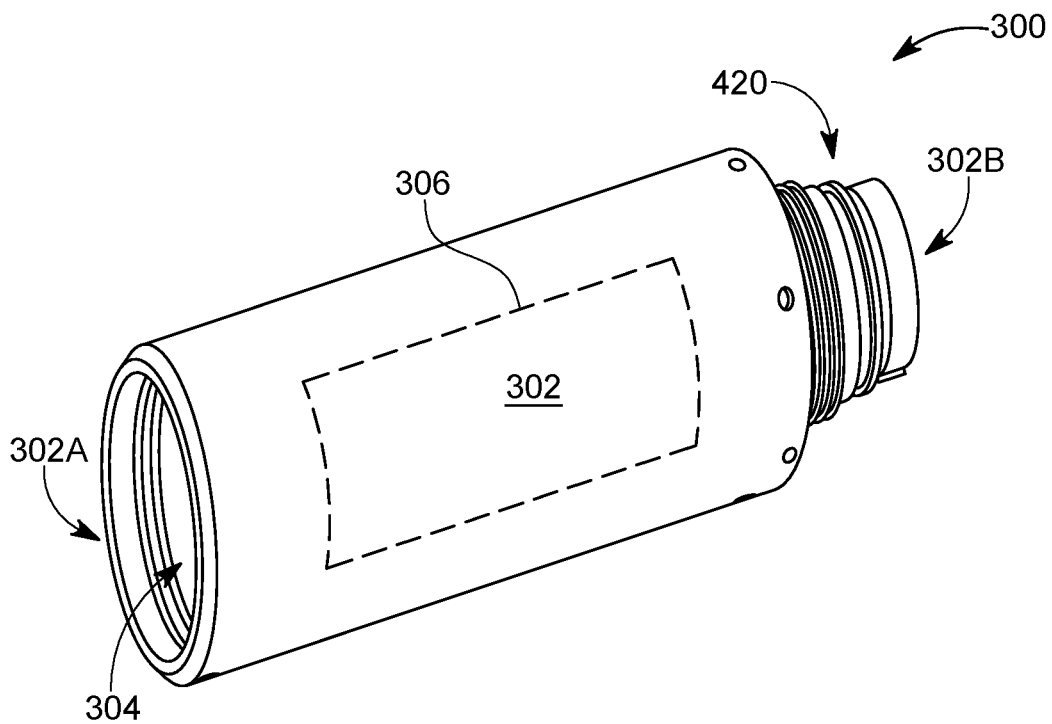
Figure 4:
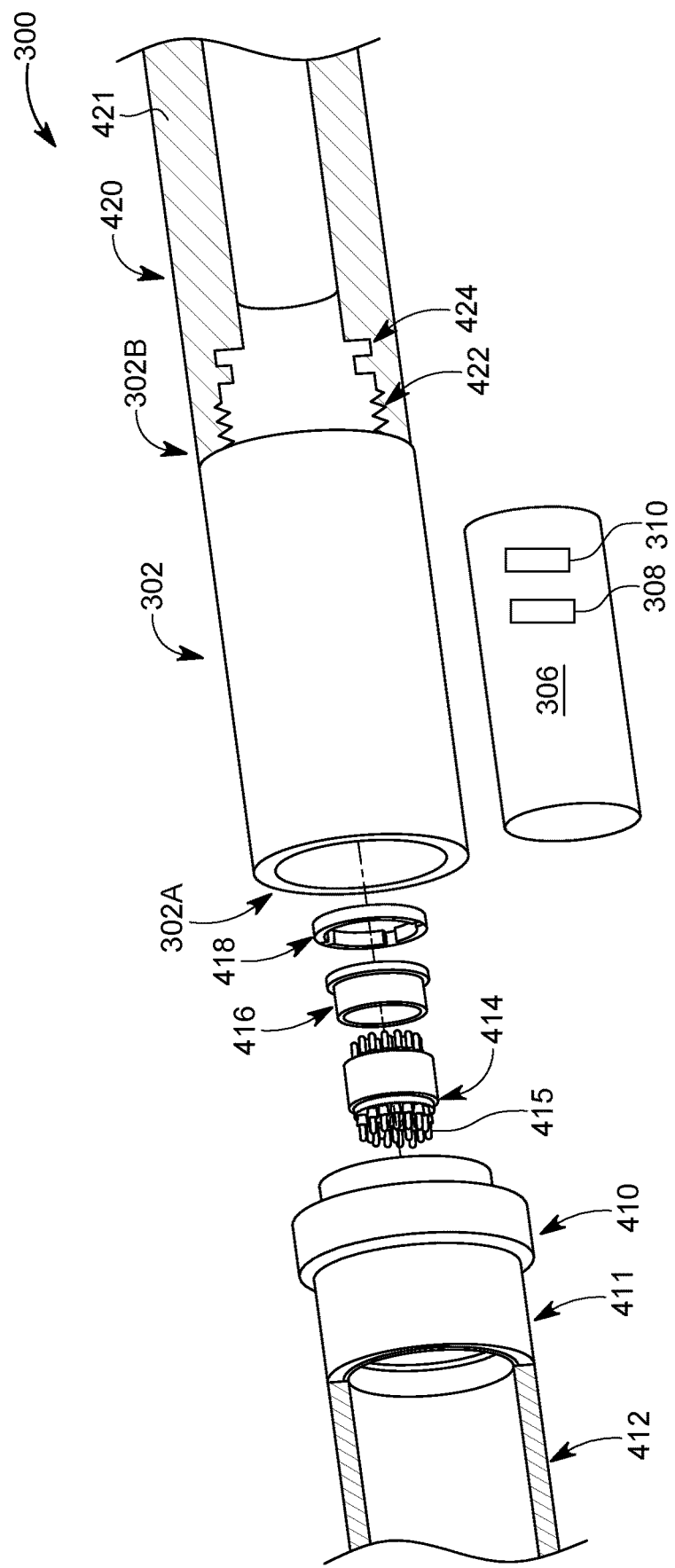
FIG. 4 illustrates the connecting module of FIGS. 3A and 3B and the internal components of the removable connecting part prior to being attached to the module.
Figure 5:
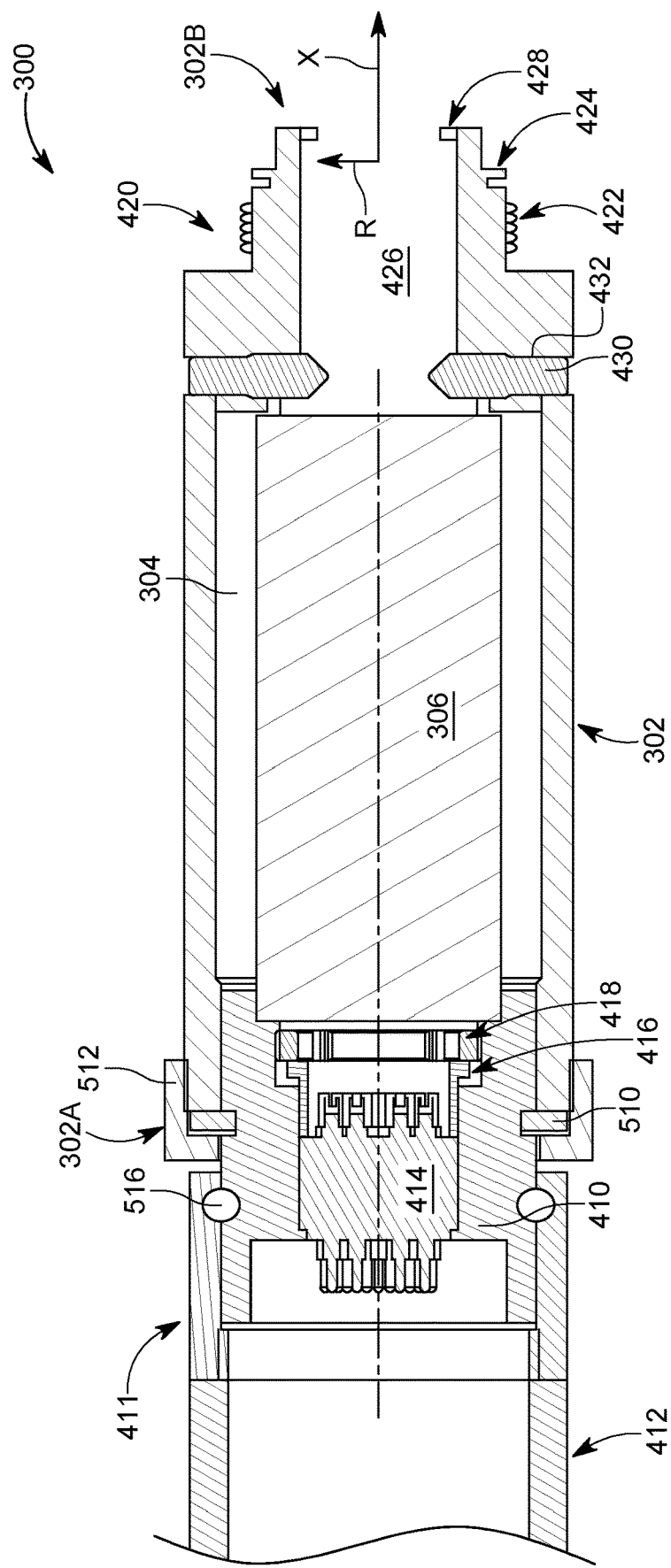
FIG. 5 illustrates the connecting module assembled with the removable connecting part and the integral connecting part having orifices that host one or more pins with conical end surfaces.

This novel configuration of this connecting module is now discussed in more detail with regard to the figures. FIGS. 3A and 3B show an overview of the connecting module 300. Note that no streamer section is shown in these figures. The connecting module 300 has a housing 302, which is made of a strong material, for example, metal or composite. The material may also be selected to resist to corrosion and bio-fouling. The housing defines a chamber 304, partially visible in FIG. 3B, in which various electronic equipment 306 is placed. The chamber 304 needs to be dry, i.e., sealed, when the connecting module 300 is deployed in water so that no water interacts with the electronics 306. One end 302A of the housing is configured to receive a removable connecting part 410, which indirectly connects a streamer section 412 or other equipment, to the connecting module 300, as illustrated in FIGS. 4 and 5. For example, the removable connecting part 410 is indirectly connected to the streamer section 412 via a coupling nut 411, as shown in FIG. 5. However, in another embodiment, it is possible to directly attach the streamer section 412 to the connecting module 300 if the streamer section 412 has the connecting part 410 or a similar connecting mechanism built in. The other end 302B of the housing 302 is differently configured, i.e., to have an integral connecting part 420, which is integrally formed/made with the housing 302. In other words, as shown in FIGS. 3A to 5, the integral connecting part 420 and the housing 302 are made of the same material as a unitary piece. This design choice avoids a weak point of the traditional connecting modules 117 as the integral connecting part 420 does not need to be attached through complicated mechanisms, e.g., spacer and screwing ring, to the housing. The only weak point is potentially left at the removable connecting part 410.

Returning to the removable connecting part 410, this component is sized to house an electrical insert 414, which is configured to electrically and/or optically connect corresponding wires/cables from the streamer section 412 to the electronic equipment 306. In one application, the electronic equipment 306 includes a processor 308 and a memory 310. Other semiconductor devices may be present for processing the acquired seismic data before sending it to the vessel along the streamer. The electrical insert 414 includes plural pins 415 for connecting each wire of the streamer section to corresponding leads or pads of the electronic equipment 306. A ring-shaped spacer 416 may be placed against the electrical insert 414 and a screwing ring 418 is configured to screw into the interior wall of the removable connecting part 410 to fix in place the electrical insert 414.

The configuration of the integral connecting part 420 is different from that of the removable connecting part 410 not only from the outside, but also from the inside. FIGS. 3A to 5 show that the integral connecting part 420 is shaped, on the outside, to have threads 422 and optionally, a ring 424, both of which are also made integrally with the housing 302 and the connecting part 420. These elements are used to attach and secure a second streamer section 421 to the integral connecting part 420. The integral connecting part 420 has a bore 426 that terminates with a shoulder or lip 428 having an internal diameter smaller than that of the bore 426, as shown in FIG. 5. The bore 426 is sized to receive a corresponding electrical/optical insert (shown in FIGS. 6A and 6B).

The integral connecting part 420 is configured to receive one or more radial pins 430, which enter through corresponding radial orifices 432 made along the radial axis R, into the body of the part 420. Any number of orifices may be used. All the orifices 432 are made to fully extend from the outside to the inside (bore) of the integral connecting part 420, i.e., throughout the entire thickness of the part 420. Corresponding radial pins 430 are sized to screw into these orifices and the pins are used, as discussed later, to fix an electrical coupler/insert at the second end 302B of the housing 302.

FIG. 5 shows that a ring 510 and a screwing ring 512 may be used to attach the removable connecting part 410 to the housing 302 and a set of balls 516 may be used to attach the first streamer section 412, through the connecting part 410, to the removable connecting part 410. Thus, with this configuration, the removable connecting part 410 can be removed from the first end 302A of the housing 302 while the integral connecting part 420 cannot. Because of this specific configuration, the electronics 306 and all the internal components of the connecting module 300 need to be inserted through the first end 302A, as the bore in the integral connecting part 410 is too small.

Figure 6A:
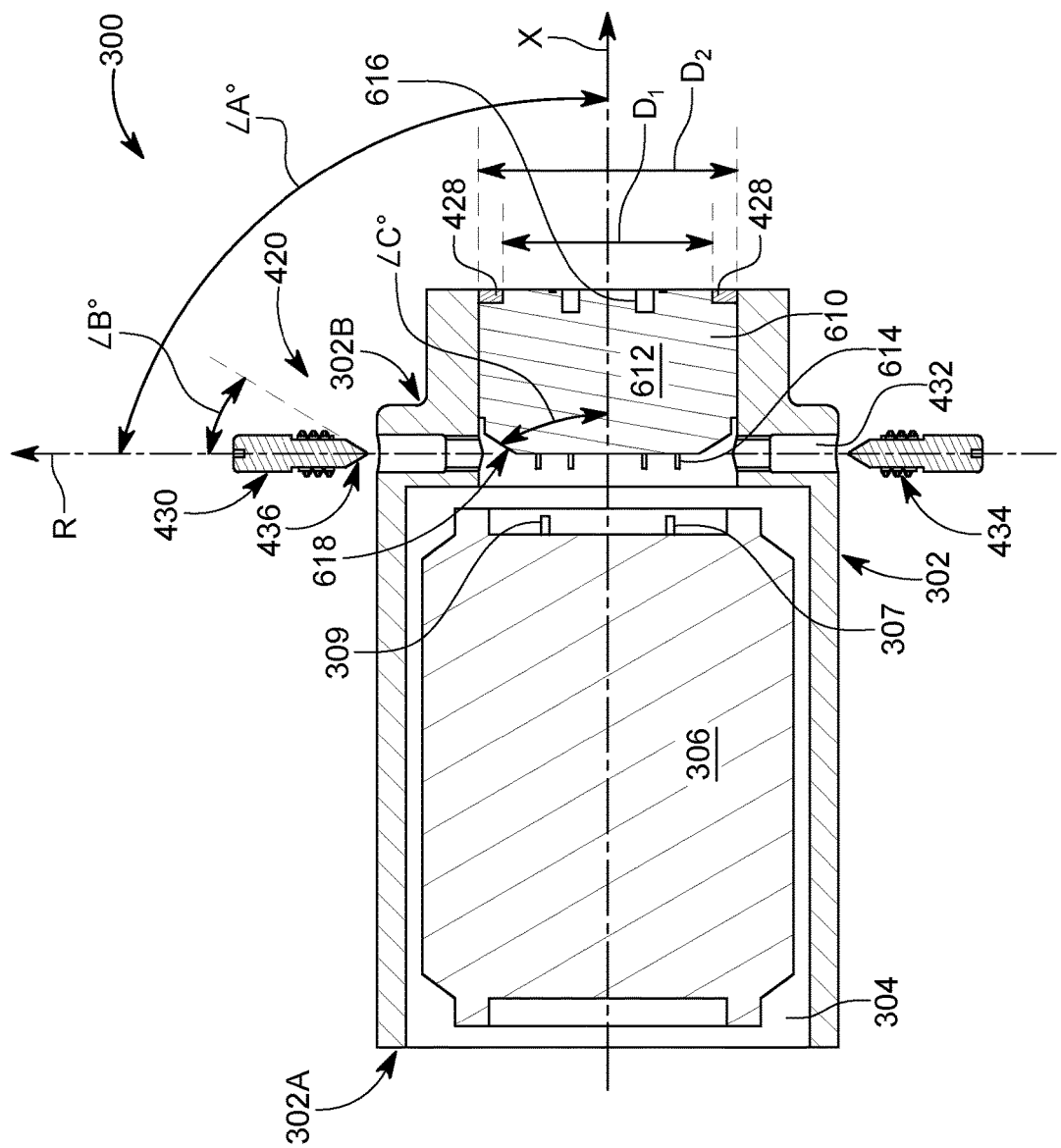
FIGS. 6A and 6B illustrate how an electrical/optical insert is fixed inside the integral connecting part with the one or more pins.
Figure 6B:
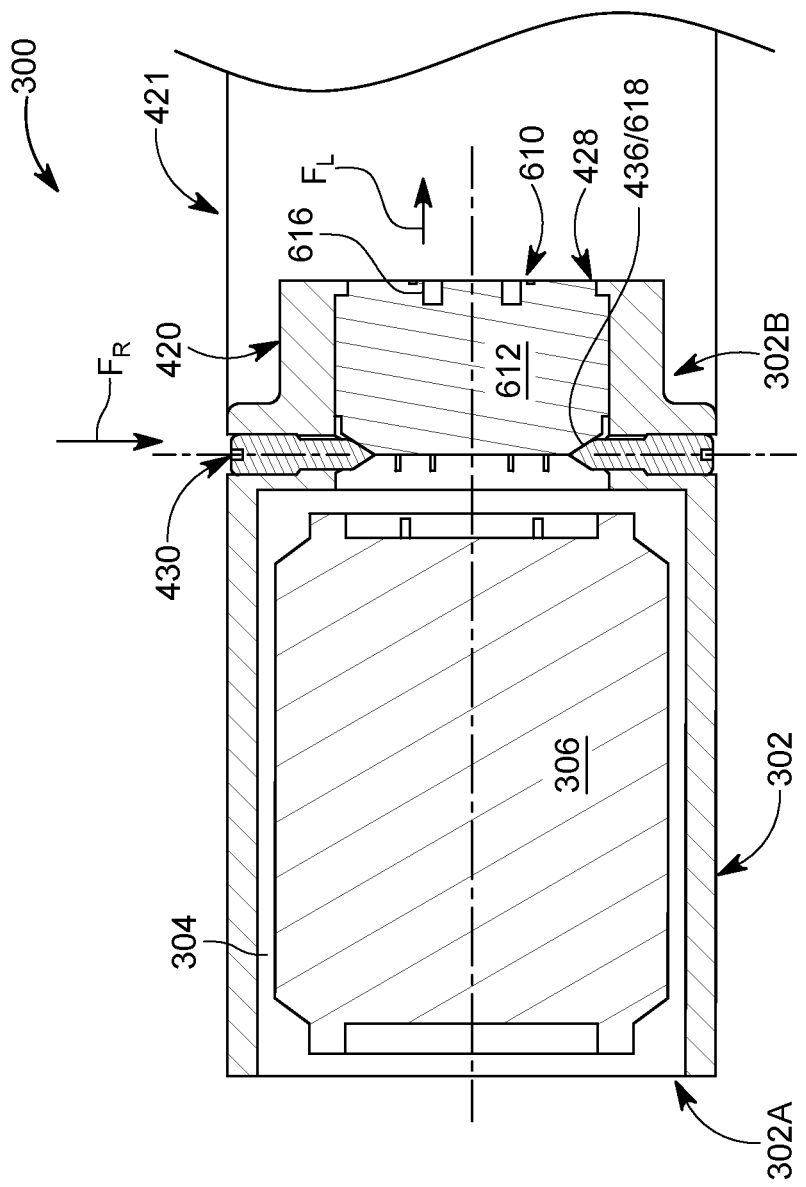

The configuration used to attach and maintain in place an electrical/optical insert 610, at the integral connecting part 420 side of the housing 302, is now discussed with regard to FIGS. 6A and 6B. The electrical/optical insert 610 has a body 612 and one or more pins or ports or pads 614. These pads may be used for electrical connections with lead pins or wires 307 and/or optical fibers 309 from the electronics 306. FIGS. 6A and 6B show the electronics 306 placed inside the chamber 304, but detached from the insert 610, for simplicity. In reality, the electronics 306 is electrically and/or optically connected to the insert 610 for exchanging data with a next streamer section 421. The insert 610 is inserted into the chamber 304 through the first end 302A, not through the second end 302B. This is so because the shoulder or rim 428 of the integral connecting part 420 has a smaller interior diameter D1 than an exterior diameter D2 of the insert 610, which means that the insert 610, when inserted from the first end 302A, sits tightly against the shoulder 428 and cannot exit the housing 302 at the second end 302B. One or more pins/pads/leads 616 are provided to the external end of the insert 610, as shown in FIGS. 6A and 6B, to connect to corresponding pins/pads/leads in the second streamer section 421.

To hold in place the insert 610, for example, for achieving a good communication connection with the corresponding streamer section 421 (see FIG. 6B), after being placed within the integral connecting part 420, the radial pins 430 are inserted into the corresponding orifices 432 (see FIG. 6A) to directly contact the insert (see FIG. 6B). As the radial pins 430 are screwed or pressed into the corresponding orifices (note the threads 434 formed into each pin 430 in this embodiment; however, in another embodiment, as discussed later, no threads are formed), a radial force is originally exerted by each pin. However, the terminal end of the pins (i.e., the ends that enter inside the integral connecting part 420) are shaped to have a conical surface 436, which makes an angle $\angle B$ relative to the radial axis R (see FIG. 6A). The conical surface 436 of the pin 430 contacts a corresponding conical surface 618 of the body 612 of the insert 610. The conical surface 618 of the body 612 makes an angle $\angle C$ with the longitudinal axis X, as shown in FIG. 6A.

When the two conical surfaces 436 and 618 contact each other, the radial force $F_R$ originally exerted onto the pin 430 is transformed into a longitudinal force $F_L$ that is applied along the longitudinal axis X of the insert 610, toward the shoulder 428. Thus, part of the radial force exerted by the pins is transformed into a longitudinal force that pushes the insert 610 against the shoulder 438, essentially immobilizing or fixing the insert 610 inside the connecting module 300. In this way, the forces that appear in the streamer due to their towing in the water do not affect or impact the electrical and/or optical connection between the insert 610 and the streamer section 421 as these two elements are fixed in place. FIG. 6A shows that the pin angle ∠B together with the insert angle ∠C form a total angle ∠A, i.e., ∠A=∠B+∠C. In one embodiment, the angle ∠A is desired to be 90°, for easiness of manufacturing and compactness of the resulting assembly. In this or another embodiment, it is desired that the pin angle is equal to the insert angle so that forces are distributed equally. In this or another embodiment, the total angle is 90° and the pin angle is equal to the insert angle. In this or another embodiment, at least two opposite pins are used to uniformly distribute the tension in the streamer. For a better centering of the insert, at least three pins uniformly distributed along the circumference of the integral connection part 420 are used.

Figure 7:
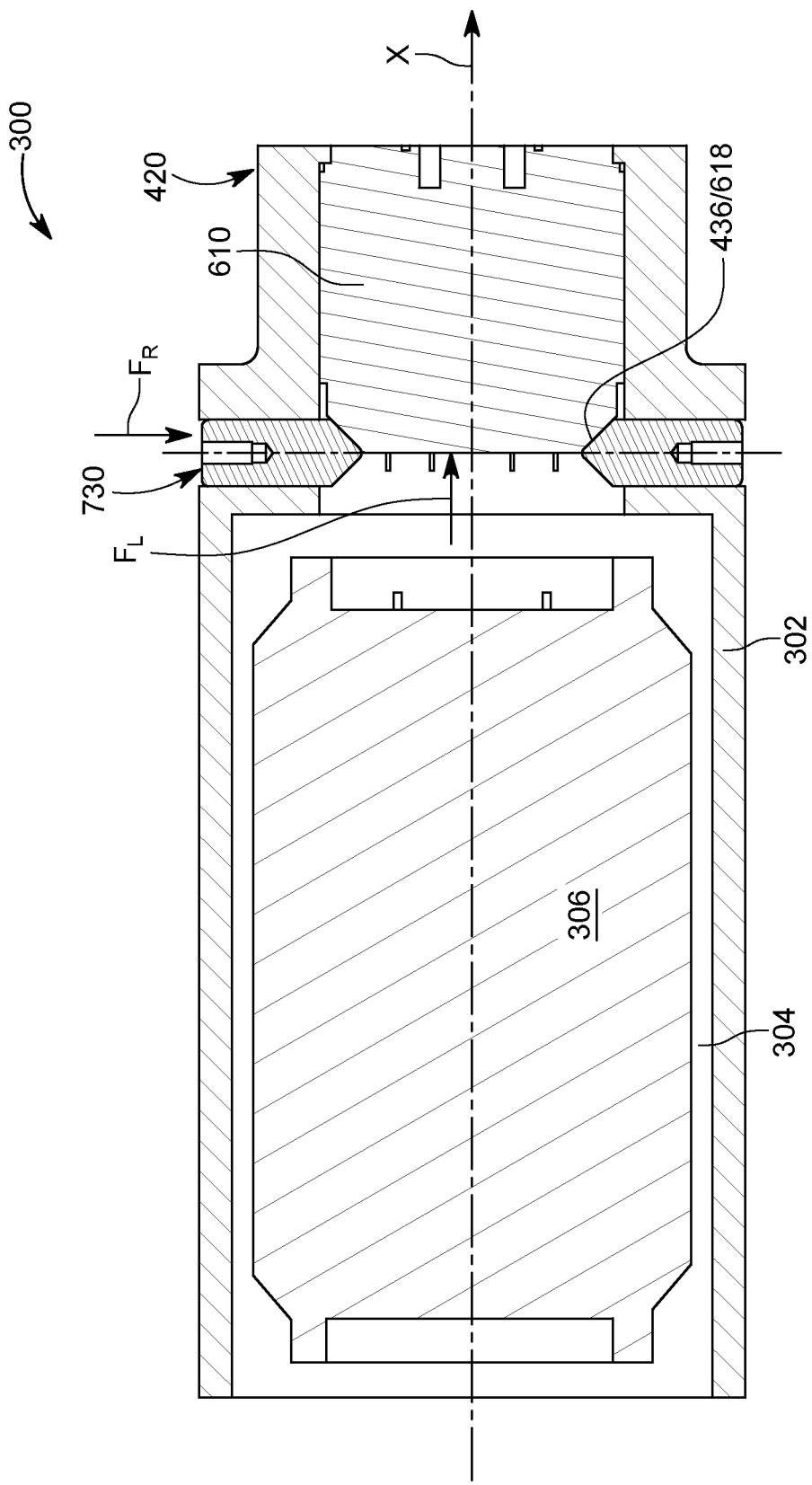
FIG. 7 shows the connecting module of FIGS. 6A and 6B having pins with no threads.

While the pins 430 in the embodiment illustrated in FIGS. 6A and 6B have threads 434, in a variation of this embodiment, as illustrated in FIG. 7, it is possible to use a pin 730 without threads, a slick pin, i.e., a self-locking implanted cotter pin. This pin works identical as the pin 430, i.e., it has a terminal, conical-shaped end 436 to fit the conical surface 618 of the insert 610, to transfer the radial force into the longitudinal force to hold the insert in place.

Figure 8:
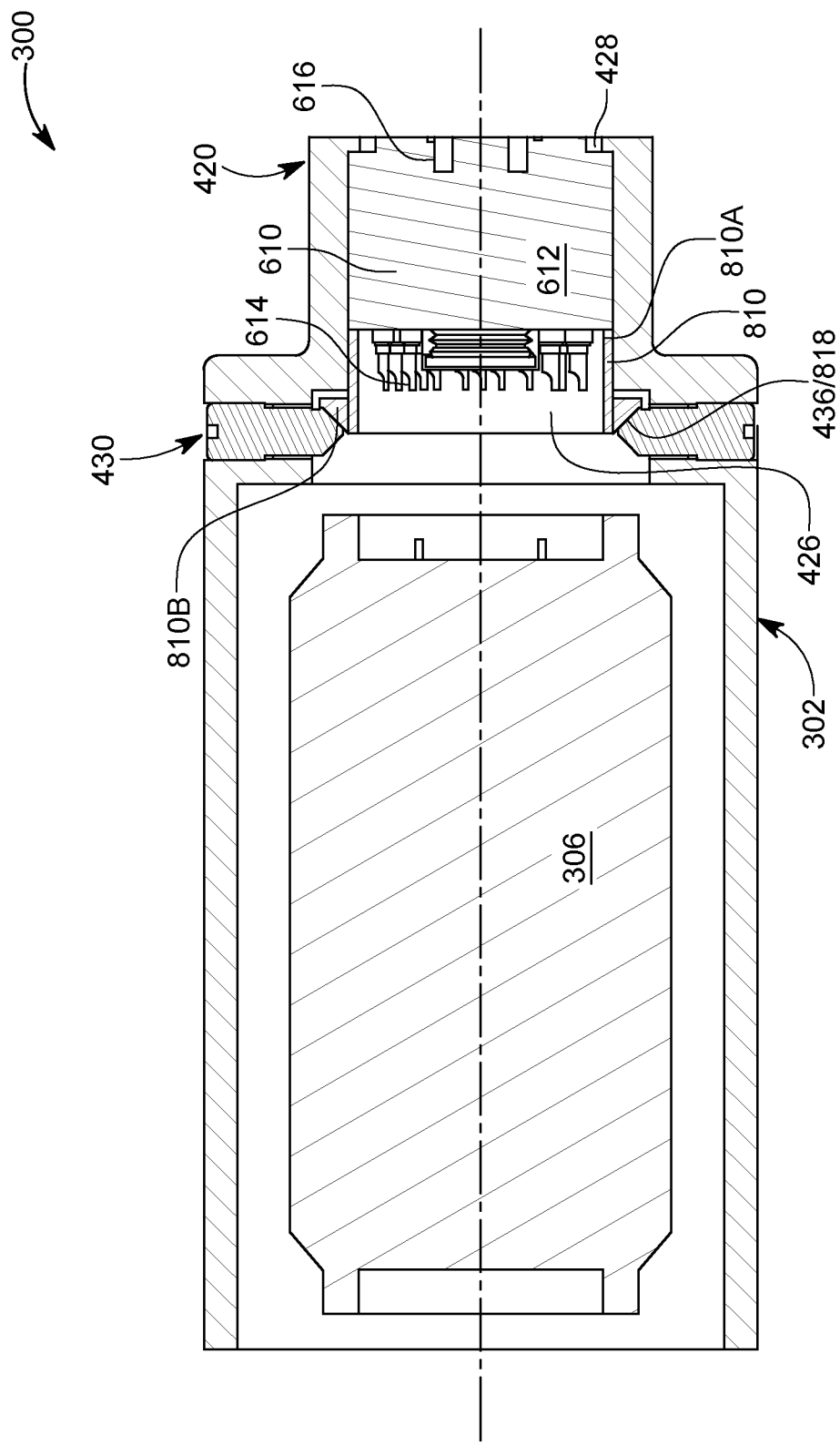
FIG. 8 shows the connecting module of FIGS. 6A and 6B having an intermediate piece for biasing the electrical/optical insert against an end of the integral connecting part.
Figure 9:
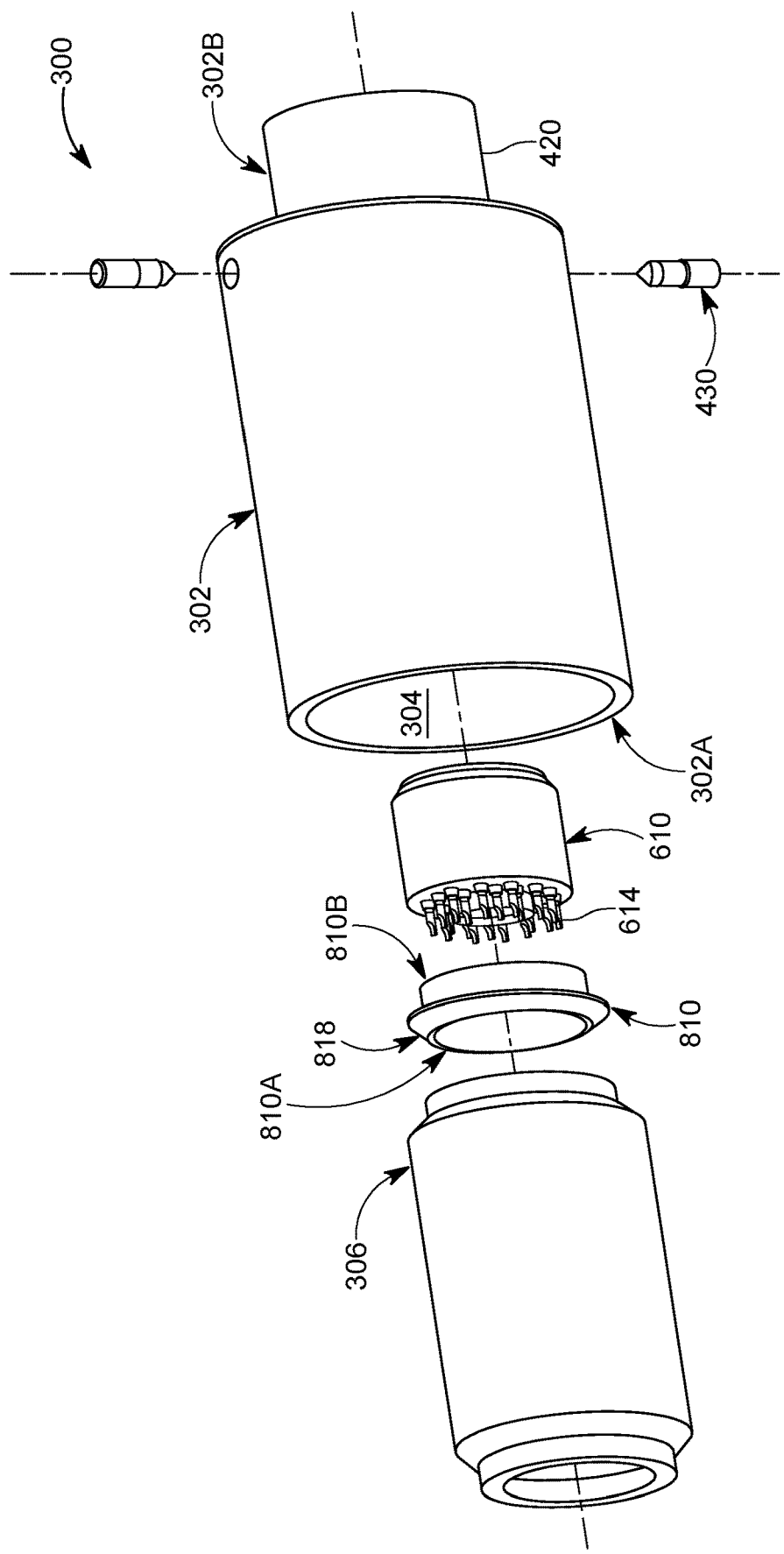
FIG. 9 shows the assembly of the intermediate piece of FIG. 8 with the electrical/optical insert within the connecting module.

In yet another variation of the connecting module 300, as illustrated in FIG. 8, it is possible to add an intermediate piece 810 between the pins 430 and the insert 610. More specifically, a circular intermediate piece 810 is placed in the bore 426 in the integral connecting part 420 to directly contact with a first end 810A of the insert 610. The other end 810B of the intermediate piece 810 is shaped to have a conical surface that matches the conical surface 818 of the insert 610. In other words, the conical surface 818 of the end 810B is made to be identical to the conical surface 618 of the insert 610 illustrated in the embodiment of FIGS. 6A and 6B. In this way, the force exerted by the pins 430 is directly transmitted to the intermediate piece 810, and the intermediate piece 810 then transmits the longitudinal force to the insert 610. With this solution, the insert 610, if already used in a traditional connecting module, does not have to be modified to have the conical surface 618. In other words, the present invention can be implemented for a traditional insert as the conical contact surface 618 of the insert 610 is achieved by the intermediate piece 810. Thus, a traditional insert can be used with the novel connecting module 300 that has the integral connecting part 420. The intermediate piece 810 may be made of any material that is strong enough to transmit the longitudinal force $F_L$ from the pins to the insert. FIG. 9 illustrates how the insert 610, intermediate piece 810, and the electronics 306 are inserted into the connecting module 300, from the first end 302A. This figure shows how the conical surface 818 at the first end 810A of the intermediate piece 810 is positioned relative to the body of the piece 810, and how its external diameter its larger than the external diameter of the body of the piece 810.

Figure 10:
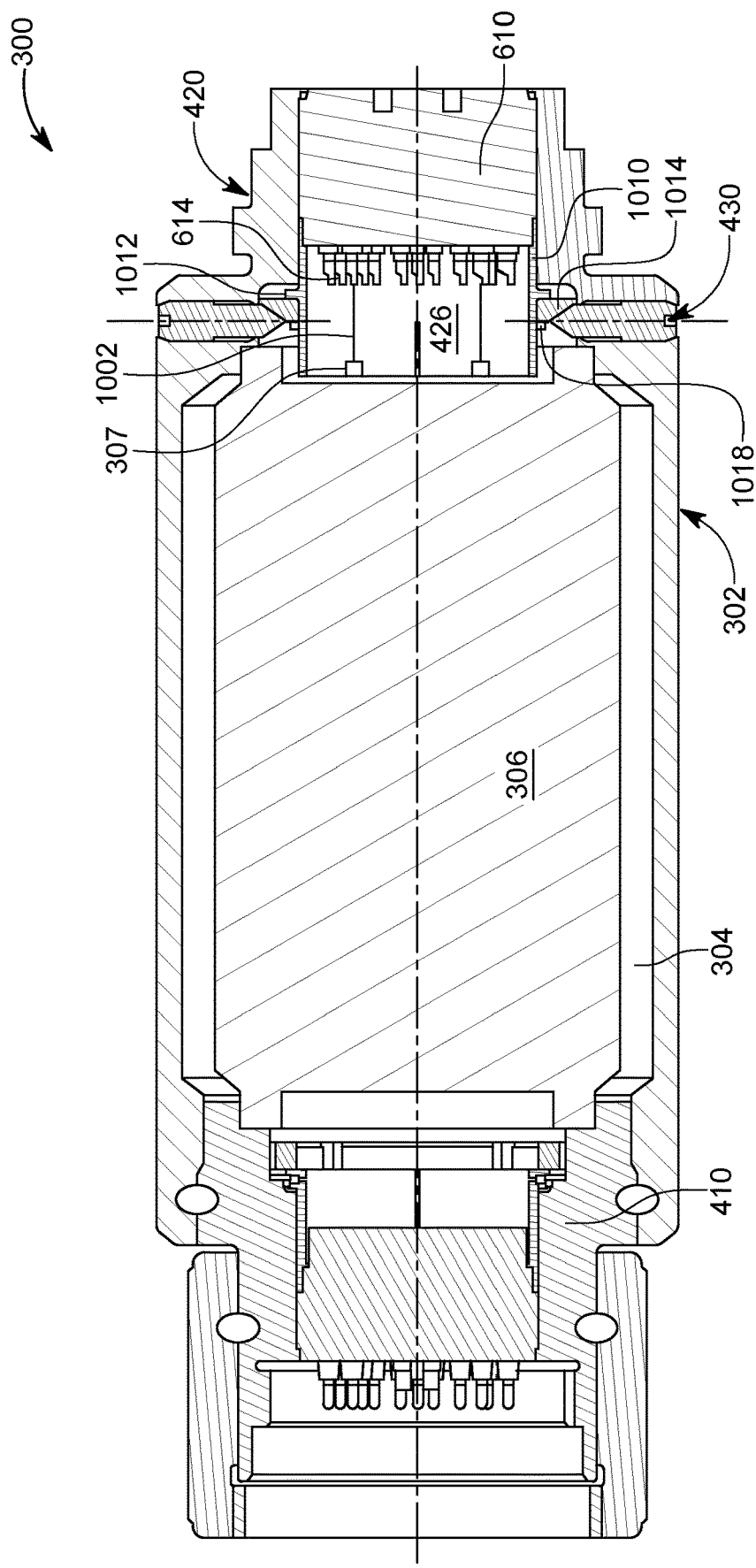
FIG. 10 shows the connecting module of FIGS. 6A and 6B having two spacers and a ring seating over the two spacers for biasing the electrical/optical insert against an end of the integral connecting part.

Another modification of the connecting module 300 is shown in the embodiment of FIG. 10, and this configuration tries to not modify the insert 610 and at the same time aims to offer a good access to the connecting wires/fibers 1002 between the electronic equipment 306 and the insert 610. More specifically, there is a pair of half spacers 1010 (see also FIG. 11) that is placed in the bore 426 of the integral connecting part 420. The two spacers 1010 form a cylinder and they are configured to contact with a first end of the insert 610, and a second end is configured to enter inside the chamber 304. The second end may contact or not the electronics 306. The two spacers 1010 may be configured to receive and protect/shield the wires/fibers 1002. Each of the spacer 1010 has an external ring 1012, which is seen in both FIGS. 10 and 11, and the external ring 1012 projects outwardly from the surface of the spacer 1010, along a radial direction.

A ring 1014, which has a triangular cross-section, is placed around the pair of spacers 1010 and the hypothenuse of the triangular cross-section acts as the conical surface 618 of the insert 610 in FIG. 6B. This means that the insert 610 in this embodiment can be a traditional insert that does not have the conical surface. For this embodiment, the radial force from the pins 430 is transmitted to the ring 1014 as a longitudinal force, and the longitudinal force is then transmitted to the external ring 1012 of the spacers 1010, and the spacers transmit this force to the insert 610. To maintain the ring 1014 in place, i.e., to prevent it from sliding along the spacers 1010, an o-ring 1018 may be used, which also keeps the two spacers 1010 together to form the cylinder.

Figure 11:
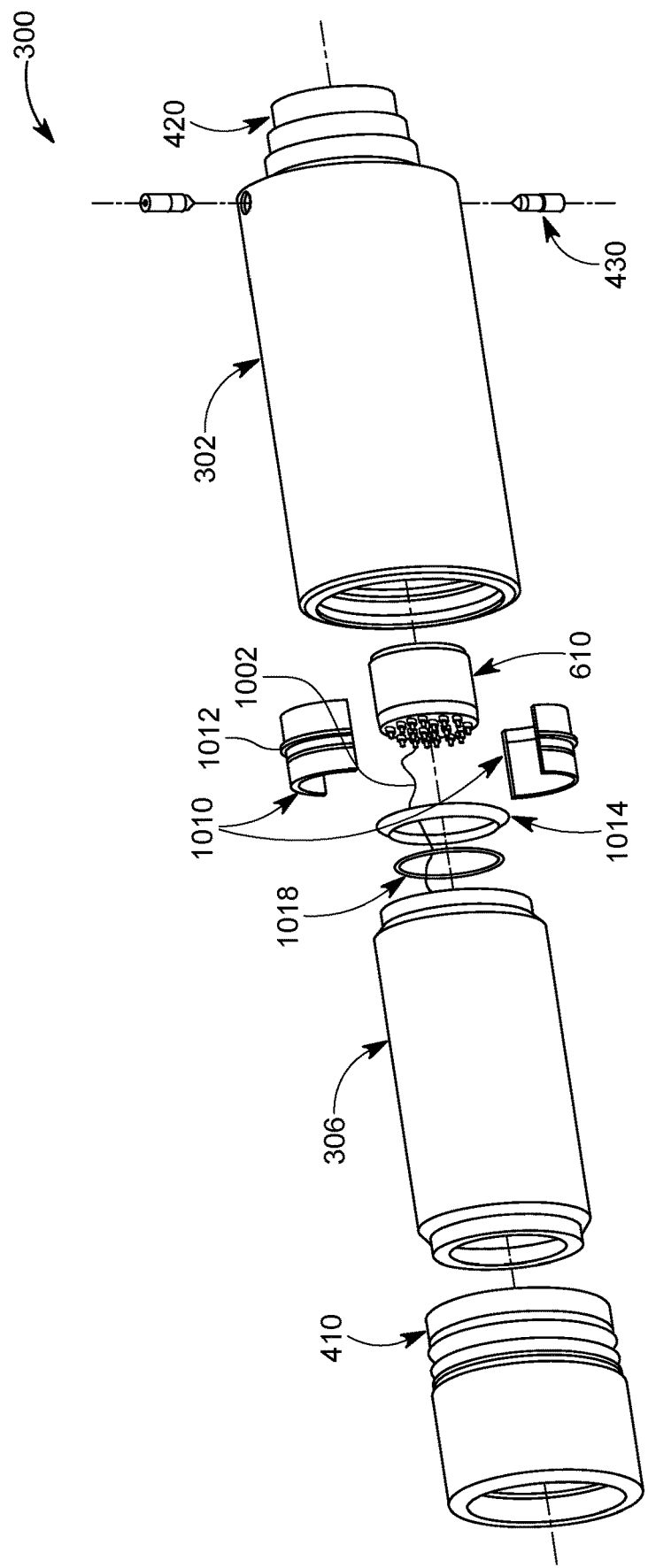
FIG. 11 shows the connecting module of FIG. 10 being assembled with the two spacers that press against the electrical/optical insert.
Figure 12:
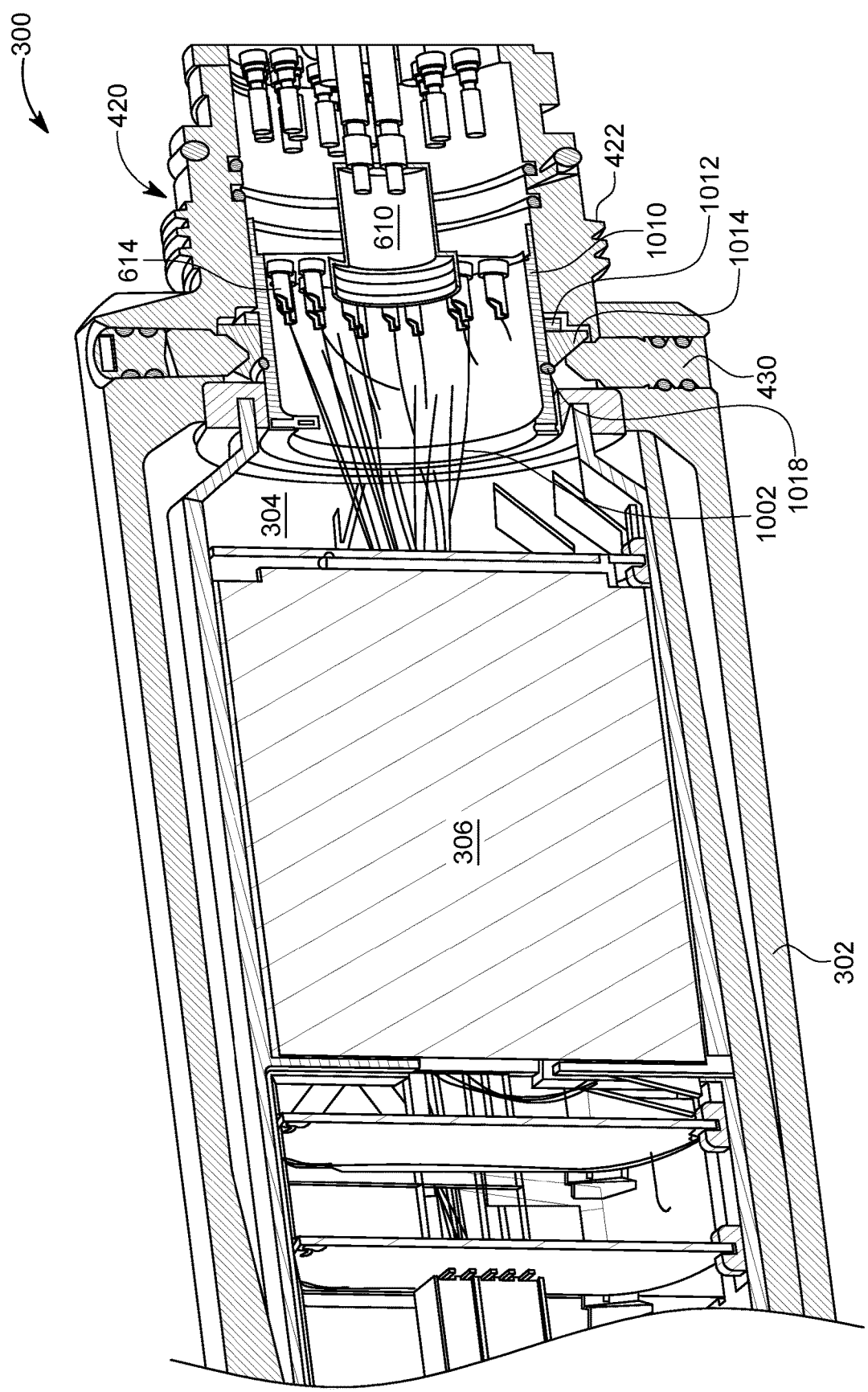
FIG. 12 is a cross-sectional view of a fully assembled connecting module with the two spacers and the ring.

FIG. 11 illustrates the order of placing all these parts inside the housing 302 of the connecting module 300, i.e., first the insert 610, then the two spacers 1010 are placed together, the ring 1014 is slid over them, and the o-ring 1018 is next slid over the spacers 1010 to keep the ring 1014 in place. The electronics 306 follows next and everything is capped with the removable connecting part 410. Note that the pins 430 are tighten only after the insert 610 is pushed in place by the electronics 306. Also note that the wires/fibers 1002 may be connected between the pins of the insert 610 and the corresponding pads of the electronics 306 after the spacers 1010, ring 1014, and o-ring 1018 are assembled, but before this assembly is placed inside the housing 302. FIG. 12 illustrates a cross-cut through the connecting module 300 when fully assembled (note that the streamer section connecting to the integral connecting part 420 is missing).

Figure 13:
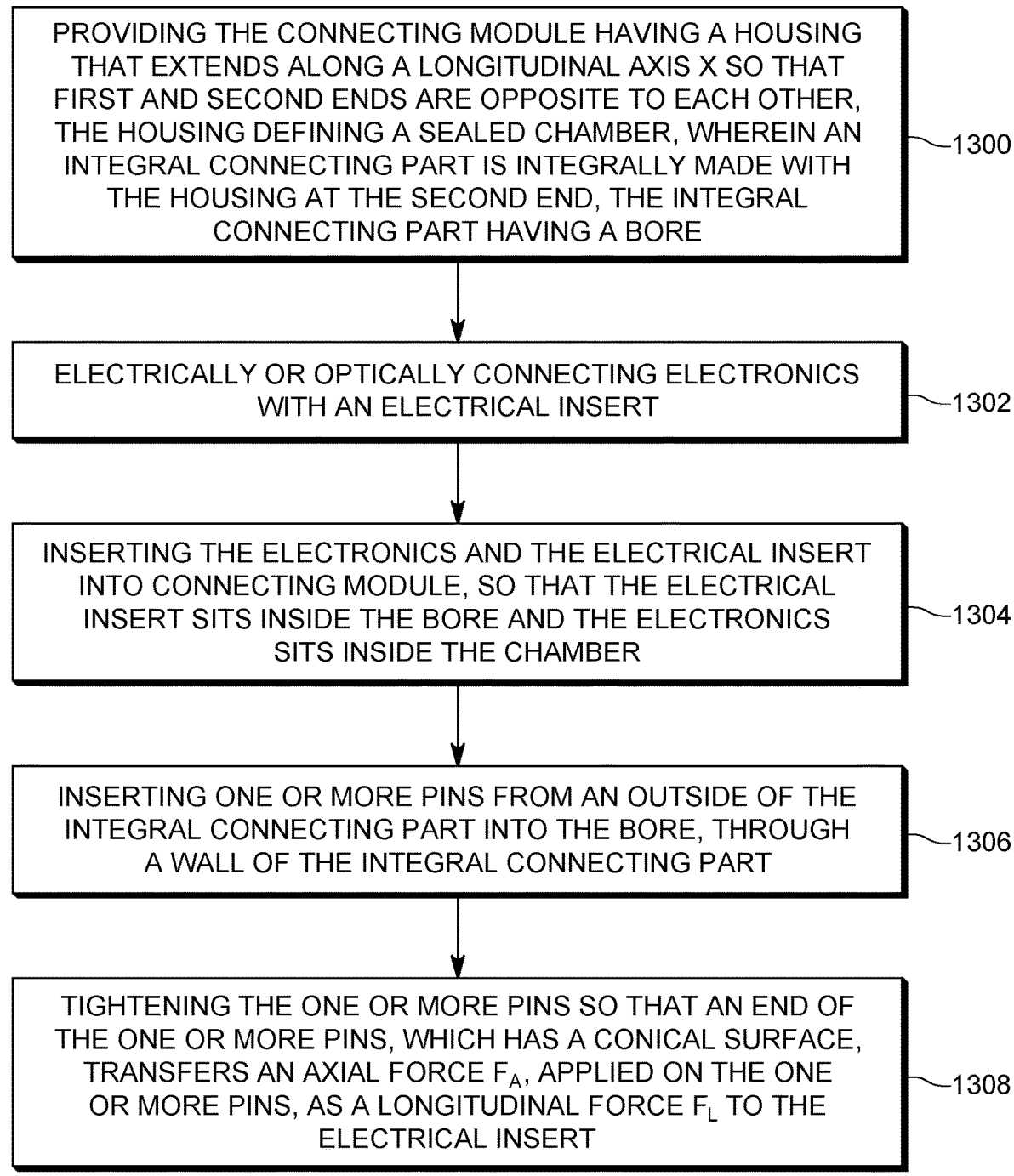
FIG. 13 is a flowchart of a method for assembling the connecting module.

A method for connecting a first streamer section 412 to a second streamer section 421 using the connecting module 300 is now discussed with regard to FIG. 13. The method includes a step 1300 of providing the connecting module having a housing that extends along a longitudinal axis X so that first and second ends are opposite to each other, the housing defining a sealed chamber, wherein an integral connecting part is integrally made with the housing at the second end, the integral connecting part having a bore, a step 1302 of electrically or optically connecting electronics with an electrical insert, a step 1304 of inserting the electronics and the electrical insert into connecting module, so that the electrical insert sits inside the bore and the electronics sits inside the chamber, a step of inserting one or more pins from an outside of the integral connecting part into the bore, through a wall of the integral connecting part, and a step 1308 of tightening the one or more pins so that an end of the one or more pins, which has a conical surface, transfers an radial force $F_R$, applied on the one or more pins, as a longitudinal force $F_L$ to the electrical insert. The method may include a step of applying the radial force $F_R$ along the radial axis of the housing and the longitudinal force $F_L$ is applied along the longitudinal axis X.

The streamer sections 412 and 421 may be identical or different. For example, the streamer section 412 may include only hydrophones for recording the pressure changes while the streamer section 421 may include only accelerometers for measuring and recording particle motion. In one application, instead of connecting two streamer sections to each other with the streamer connecting module, it is possible to connect a streamer section and another part of the streamer to each other. This another part may be a bird (a device used to control a position of the streamer in water), or a recovery system, or a shorter streamer, or a tail buoy. In yet another embodiment, the connecting module may be used to connect the streamer to the vessel or a source to the vessel, or for any other underwater connection. The various configurations of the connecting module discussed above may simply replace the existing streamer connector as the connectors to the streamer sections are similar. Thus, no down-time for retrofitting the existing streamers is necessary.

The disclosed embodiments provide a connecting module and a method for assembling such module. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A connecting module for connecting seismic equipment towed in water, the connecting module comprising:
   a housing extending along a longitudinal axis X so that first and second ends are opposite to each other;
   a removable connecting part removably attached to the first end of the housing;
   an integral connecting part integrally made with the housing at the second end, the integral connecting part having a bore; and
   one or more pins configured to enter from an outside of the integral connecting part into the bore,
   wherein an end of the one or more pins has a conical surface that is configured to transfer a radial force $F_R$ applied to the one or more pins, as a longitudinal force $F_L$ to an electrical insert to be placed in the bore, and
   wherein the radial force $F_R$ is applied along a radial axis of the housing and the longitudinal force $F_L$ is applied along the longitudinal axis X.

2. The connecting module of claim 1, further comprising:
   the electrical insert, wherein a first end of the electrical insert sits against a shoulder of the integral connecting part, and a second end of the electrical insert is in direct contact with the one or more pins.

3. The connecting module of claim 2, wherein the electrical insert has a conical surface that matches the conical surface of the one or more pins.

4. The connecting module of claim 3, wherein the conical surface of the electrical insert and the conical surface of the one or more pins make a 45 angle with the longitudinal axis and the radial axis, respectively.

5. The connecting module of claim 2, further comprising:
   electronics located in a chamber defined by the housing, wherein the electronics is electrically or optically coupled to the electrical insert.

6. The connecting module of claim 1, wherein the one or more pins have threads for being attached to the housing.

7. The connecting module of claim 1, further comprising:
   an intermediate piece configured to sit in the bore, in direct contact with the electrical insert, the intermediate piece having a conical surface at one end that extends outwardly from a body of the intermediate piece, and the conical surface directly contacts an end of the one or more pins.

8. The connecting module of claim 1, further comprising:
   two spacers configured to form a cylinder, the two spacers being configured to sit inside the bore, in direct contact with the electrical insert, the two spacers having an external ring; and
   a ring configured to slide over the two spacers and hold them together, the ring having a conical surface that extends outwardly from a body of the ring, and the conical surface directly contacts an end of the one or more pins,
   wherein the ring is configured to be pressed against the external ring of the two spacers by the one or more pins.

9. The connecting module of claim 8, further comprising:
   an o-ring that is configured to slide over the two spacers and hold the ring in place.

10. The connecting module of claim 1, wherein the removable connecting part is configured to indirectly connect to a first streamer section and the integral connecting part is configured to connect to a second streamer section.

11. A connecting module for connecting seismic equipment towed in water, the connecting module comprising:
    a housing extending along a longitudinal axis X so that first and second ends are opposite to each other, the housing defining a sealed chamber;
    electronics located within the chamber;
    an integral connecting part integrally made with the housing at the second end, the integral connecting part having a bore;
    an electrical insert located within the bore and configured to electrically or optically connect to the electronics; and
    one or more pins configured to enter from an outside of the integral connecting part into the bore, through a wall of the integral connecting part,
    wherein an end of the one or more pins has a conical surface that is configured to transfer a radial force $F_R$, applied on the one or more pins, as a longitudinal force $F_L$ to the electrical insert.

12. The connecting module of claim 11, wherein the radial force $F_R$ is applied along a radial axis of the housing and the longitudinal force $F_L$ is applied along the longitudinal axis X.

13. The connecting module of claim 11, wherein a first end of the electrical insert sits against a shoulder of the integral connecting part, and a second end of the electrical insert is in direct contact with the one or more pins.

14. The connecting module of claim 13, wherein the electrical insert has a conical surface that matches the conical surface of the one or more pins.

15. The connecting module of claim 14, wherein the conical surface of the electrical insert and the conical surface of the one or more pins make a 45 angle with the longitudinal axis and the radial axis, respectively.

16. The connecting module of claim 11, wherein the one or more pins have threads for being attached to the housing.

17. The connecting module of claim 11, further comprising:
an intermediate piece configured to sit in the bore, in direct contact with the electrical insert, the intermediate piece having a conical surface at one end that extends outwardly from a body of the intermediate piece, and the conical surface directly contacts an end of the one or more pins.

18. The connecting module of claim 11, further comprising:
two spacers configured to form a cylinder and configured to sit inside the bore, in direct contact with the electrical insert, the two spacers having an external ring; and
a ring configured to slide over the two spacers and hold them together, the ring having a conical surface that extends outwardly from a body of the ring, and the conical surface directly contacts an end of the one or more pins,
wherein the ring is configured to be pressed against the external ring of the two spacers by the one or more pins.

19. A method for connecting a first streamer section to a second streamer section, the method comprising:
providing a connecting module having a housing that extends along a longitudinal axis X so that first and second ends are opposite to each other, the housing defining a sealed chamber, wherein an integral connecting part is integrally made with the housing at the second end, the integral connecting part having a bore;
electrically or optically connecting electronics with an electrical insert;
inserting the electronics and the electrical insert into the connecting module so that the electrical insert sits inside the bore and the electronics sits inside the chamber;
inserting one or more pins, from an outside of the integral connecting part, toward the bore, through a wall of the integral connecting part; and
tightening the one or more pins so that an end of the one or more pins, which has a conical surface, enters the bore and transfers a radial force $F_R$, applied on the one or more pins, as a longitudinal force $F_L$ to the electrical insert.

20. The method of claim 19, further comprising:
applying the radial force $F_R$ along a radial axis of the housing and the longitudinal force $F_L$ is applied along the longitudinal axis X.

* * * * *